United States Patent [19]

Akashi et al.

[11] Patent Number: 5,354,498
[45] Date of Patent: Oct. 11, 1994

[54] PHASE SEPARATION LIQUID CRYSTAL POLYMER

[75] Inventors: Ryojiro Akashi; Akinori Inoue; Yutaka Akasaki, all of Kanagawa, Japan

[73] Assignee: Fuji Xerox Co., Ltd., Tokyo, Japan

[21] Appl. No.: 987,991

[22] Filed: Dec. 9, 1992

Related U.S. Application Data

[63] Continuation of Ser. No. 670,319, Mar. 15, 1991, abandoned.

[30] Foreign Application Priority Data

Mar. 16, 1990 [JP] Japan ................................. 2-67982

[51] Int. Cl.$^5$ ....................... C09K 19/52; C09K 19/56; C09K 19/54; G02F 1/13
[52] U.S. Cl. ........................... 252/299.01; 252/299.4; 252/299.5; 252/582; 359/96
[58] Field of Search ............ 252/299.01, 299.5, 299.4; 359/96

[56] References Cited

U.S. PATENT DOCUMENTS

| | | | |
|---|---|---|---|
| 4,631,328 | 12/1986 | Ringsdorf et al. | 526/259 |
| 4,890,902 | 1/1990 | Doane et al. | 252/299.01 X |
| 4,891,152 | 1/1990 | Miller et al. | 252/299.01 |
| 4,904,066 | 2/1990 | Gray et al. | 359/104 X |
| 4,915,867 | 4/1990 | Morita et al. | 252/299.5 |
| 4,994,204 | 2/1991 | Doane et al. | 252/299.01 |
| 5,011,624 | 4/1991 | Yamagishi et al. | 252/299.5 |
| 5,087,387 | 2/1992 | Mullen et al. | 252/299.5 |
| 5,093,271 | 3/1992 | West | 528/418 |
| 5,207,952 | 5/1993 | Griffin et al. | 252/582 |
| 5,240,636 | 8/1993 | Doane et al. | 252/299.01 |
| 5,242,616 | 9/1993 | Finkenzeller et al. | 252/299.01 |

FOREIGN PATENT DOCUMENTS

| | | |
|---|---|---|
| 2042415 | 2/1990 | Japan . |
| 2086692 | 3/1990 | Japan . |
| 2089023 | 3/1990 | Japan . |
| 2171720 | 7/1990 | Japan . |

Primary Examiner—Robert L. Stoll
Assistant Examiner—C. Harris
Attorney, Agent, or Firm—Finnegan, Henderson, Farabow, Garrett & Dunner

[57] ABSTRACT

A phase separation liquid crystal polymer for displays, optical shutters and memories is disclosed, having on the side chains thereof at least one liquid crystal component and at least one non-liquid crystal component, said liquid crystal component and non-liquid crystal component being present in separate phases. The polymer has an increased degree of freedom in control of physical properties and exhibits improved resolving power, improved contrast, and improved rate of response.

14 Claims, 1 Drawing Sheet

OIL DROPLET FORM

OIL DROPLET FORM

SPONGE-LIKE FORM

OIL DROPLET FORM

LAYER FORM

PHASE SEPARATION LIQUID CRYSTAL POLYMER

This application is a continuation, of application Ser. No. 07/670,319 filed Mar. 15, 1991, abandoned.

FIELD OF THE INVENTION

This invention relates to a liquid crystal polymer which is suitable for use in displays, optical shutters, memories, etc.

BACKGROUND OF THE INVENTION

Low-molecular weight liquid crystal compounds as represented by, for example, the following structural formula:

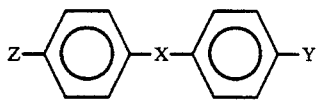

wherein X represents a single bond, COO, CH=N or N=N, Y represents a cyano group, a halogen atom or an alkoxy group, and Z represents an alkyl group, have been widespread as a display material. In recent years, liquid crystal polymers having these low-molecular weight liquid crystal compounds introduced into the side chain thereof (hereinafter referred to as side chain type liquid crystal polymer) have been developed. Further, it has been proposed to blend low-molecular weight liquid crystal compounds with a polymer to obtain a hybrid type display material which is expected to be applied to wide area display elements as disclosed, e.g., in U.S. Pat. No. 4,435,047.

However, since the side chain type liquid crystal polymers are pendent with a liquid crystal component only, they have a low degree of freedom in control of physical properties and a low rate of response due to their high viscosity, and thus have difficulty in application to display elements.

SUMMARY OF THE INVENTION

An object of the present invention is to provide a phase separation liquid crystal polymer whose physical properties are controllable with an increased degree of freedom and which achieves high resolving power and high contrast, making it feasible to produce displays and memories as well as optical shutters having satisfactory response properties.

It has now been found that the above object of the present invention is accomplished by additionally copolymerizing a non-liquid crystal compound to prepare a liquid crystal polymer in which a liquid crystal component and a non-liquid crystal component are in separate phases.

The present invention relates to a phase separation liquid crystal polymer for display devices, optical shutters and memories which has on the side chains thereof at least one liquid crystal component and at least one non-liquid crystal component, said liquid crystal component and non-liquid crystal component being present in separate phases.

Figure 1A:
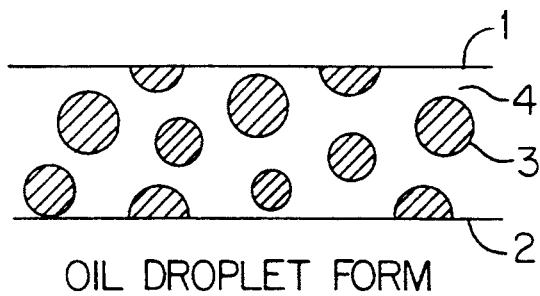
FIGS. 1(A), (B), (C) and (D) show typical modes of phase separation.
Figure 1C:
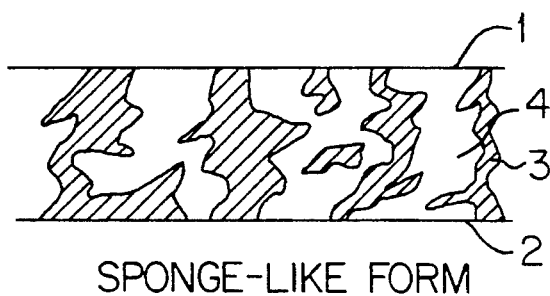
Figure 1B:
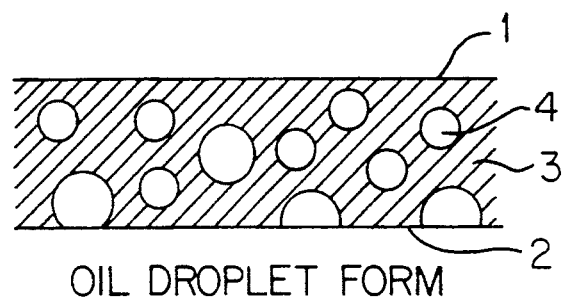
Figure 1D:
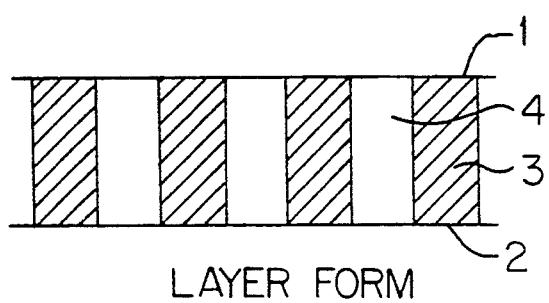

wherein 1 and 2 each is a transparent electrode, 3 is a liquid crystal component, 4 is a non-liquid crystal component, and 5 is a liquid crystal molecule.

DETAILED DESCRIPTION OF THE INVENTION

The phase separation liquid crystal polymer according to the present invention is a kind of side chain type liquid crystal polymers and has a liquid crystal component derived from a liquid crystal compound and a non-liquid crystal component derived from a non-liquid crystal compound as side chains in separate phases.

The terminology "phase separation" or "in separate phases" as used herein means that plurality of components derived from a plurality of compounds differing in chemical or physical properties, e.g., solubility, exists in a mutually incompatible state. For example, included in such a state is a state wherein domains constituted of an aggregate of a liquid crystal compound and that constituted of an aggregate of a non-liquid crystal compound exist separately. Individual domains in phase separation may have various forms, such as a sponge-like form, an oil droplet form, a layer form, etc. Examples of these forms are shown in FIG. 1 for illustrative purposes only but not for limitation.

Liquid crystal compounds which can be used in the present invention include various known compounds, such as biphenyl compounds, phenyl benzoate compounds, cyclohexylbenzene compounds, azoxybenzene compounds, azobenzene compounds, azomethine compounds, biphenyl benzoate compounds, cyclohexylbiphenyl compounds, terphenyl compounds, and cholesterol compounds. In cases where a liquid crystal compound is introduced into a polymer by copolymerization, preferred liquid crystal compounds are those having a polymerizable functional group, e.g., an acrylic ester group (e.g., acrylic ester group and methacrylic ester group), a vinyl group, and a vinylphenyl group. These compounds are described in *Makromol. Chem.*, Vol. 179, pp. 273–276 (1978) and *Eur. Polym. J.*, Vol. 18, p. 651 (1982). Particularly preferred of them are those having an acrylic group from the viewpoint of their high polymerizability. In cases where a liquid crystal compound is introduced into a polymer by addition reaction to a reactive polymer, those having an unsaturated double bond (e.g., an allyl group) are used. Such compounds are described in *Makromol. Chem. Rapid Commun.*, Vol. 3, p. 557 (1982).

Typical examples of the above-mentioned liquid crystal compounds are shown below.

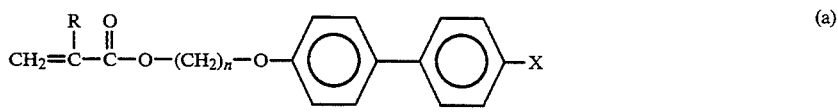

(a)

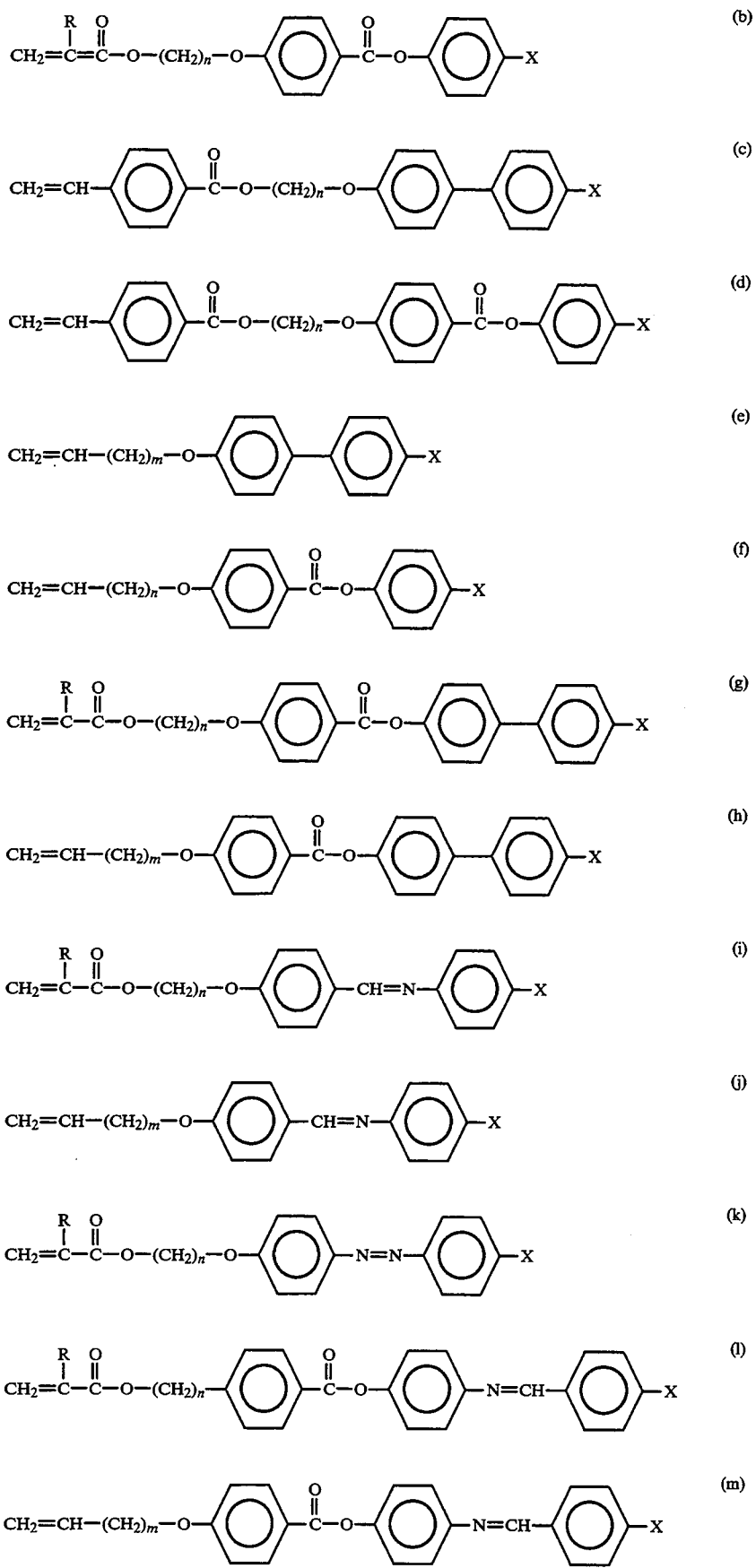

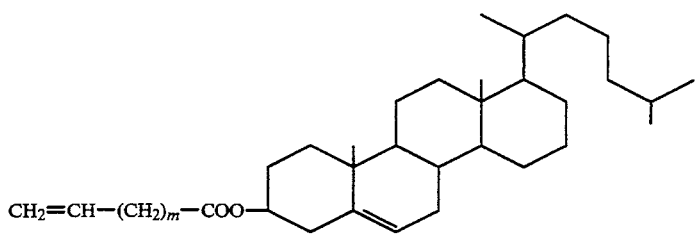

(n)

wherein R represents a methyl group or a hydrogen atom; X represents a halogen atom, a cyano group, an alkoxy group having 1 to 10 carbon atoms, or a halogen substituted alkyl group having 1 to 10 carbon atoms; n represents an integer of from 2 to 30; and m represents an integer of from 1 to 20.

Non-liquid crystal compounds which can be used in the present invention are not particularly limited as long as they have no liquid crystal properties. Preferred non-liquid crystal compounds are those having low compatibility with the above-described liquid crystal compound and capable of forming, when introduced into a polymer, a domain in a phase separated from that formed by the liquid crystal compound.

Where a non-liquid crystal component is introduced into a polymer by polymerization, addition polymerizable vinyl compounds, e.g., (meth)acrylic acid, (meth)acrylic acid alkyl derivatives such as methyl (meth)acrylate, ethyl (meth)acrylate, propyl (meth)acrylate, isopropyl (meth)acrylate, butyl (meth)acrylate, sec-butyl (meth)acrylate, tert-butyl (meth)acrylate, 3-pentyl (meth)acrylate, hexyl (meth)acrylate, heptyl (meth)acrylate, octyl (meth)acrylate, decyl (meth)acrylate, dodecyl (meth)acrylate, cyclohexyl (meth)acrylate, hydroxyethyl(meth)acrylate, dimethylaminoethyl (meth)acrylate, methoxyoligoethylene glycol (meth)acrylate, and methoxypolyethylene glycol mono(meth)acrylate, styrene and derivatives thereof, (meth)acrylamide, butadiene and derivatives thereof, ethylene and derivatives thereof, vinyl chloride, vinylidene chloride, (meth)acrylonitrile, and N-vinyl-2-pyrrolidone are used.

Where a liquid crystal component and a non-liquid crystal component are introduced into a polymer by an addition reaction to a reactive polymer, non-liquid crystal compounds having an unsaturated double bond or an active proton are used. In particular, those having an alkyl group such as 1-propene, 1-butene, 1-pentene, 1-hexene, 1-octene, 1-decene and 1-dodecene are preferred because of their low compatibility with liquid crystal compounds.

The phase separation liquid crystal polymer of the present invention can be prepared by copolymerizing a liquid crystal compound and a non-liquid crystal compound (polymerization process) or addition of a crystal compound and a non-liquid crystal compound to a reactive polymer (addition reaction process). As stated above, a polymerization process can be carried out in a usual manner, e.g., by radical polymerization or ionic polymerization of at least one polymerizable liquid crystal compound and at least one polymerizable non-liquid crystal compound. An addition reaction process can be carried out by adding a liquid crystal compound and a non-liquid crystal compound to a reactive polymer having a reactive group, e.g., an active proton, a halogen atom or an unsaturated double bond, in the presence of a catalyst. Examples of usable reactive polymers include partially hydrogenated silicone polymers. In using a partially hydrogenated silicone polymer, a liquid crystal compound and a non-liquid crystal compound both having an unsaturated double bond at the terminal thereof can be added thereto in the presence of a platinum catalyst.

The phase separation liquid crystal polymer of the present invention may have various copolymer forms, such as a random copolymer, a block copolymer, a graft copolymer, etc.

A composition ratio of the liquid crystal compound to the non-liquid crystal compound in the liquid crystal polymer varies depending on a desired state of phase separation. A preferred proportion of the liquid crystal compound is from 10 to 99.9% by weight, and more preferably from 50 to 99.5% by weight.

In application to display materials or optical shutters, it is preferable that the liquid crystal polymer has a glass transition temperature (Tg) of not more than 30° C., and particularly not more than 0° C., so as to have a further increased rate of response. In application to memory materials, it is preferable that the liquid crystal polymer has a Tg of not lower than 30° C. from the standpoint of memory stability.

Figure 2A:
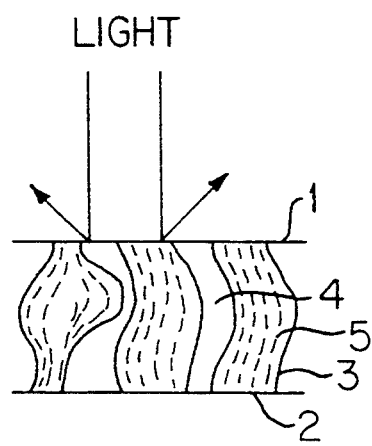
FIGS. 2(A) and (B) illustrate the working mechanism of the phase separation liquid crystal polymer of the present invention.
Figure 2B:
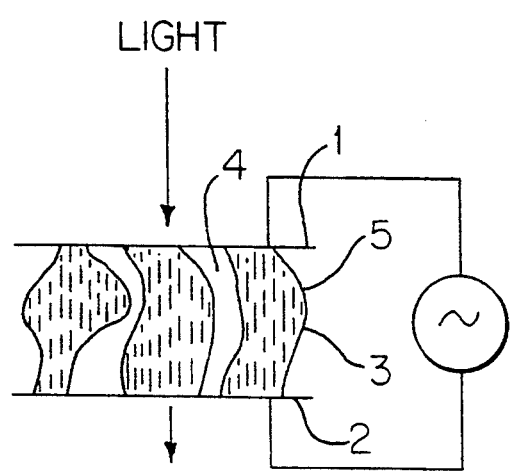

While a working mechanism of the phase separation liquid crystal polymer or a composition thereof has not yet been made clear, the following assumption could be made. With no electric field applied, since the liquid crystal component and non-liquid crystal component are in separate phases and these components are different in a refractive index, scattering of incident light is caused so as to make the polymer turbid. If an appropriate electric field is applied to the polymer, the liquid crystal molecules are orientated to make the refractive index the same, and the polymer becomes transparent accordingly, permitting of transmission of incident light. The mechanism based on the assumption is depicted in FIG. 2. FIG. 2(A) illustrates a turbid state with no electric field applied, and FIG. 2(B) illustrates a transparent state with an electric field applied.

A phase separation polymer having a Tg of not higher than 30° C. has no memory effect with no electric field applied and is therefore applicable as a display element. On the other hand, a phase separation polymer having a Tg of higher than 30° C. has a memory effect and is applicable as a memory element. For example, a transparent state can be retained even after cut-off of electricity as in FIG. 2(B). When the polymer in this state is partially heated and then rapidly cooled, the heated area turns to turbid as shown in FIG. 2(A), thus making a memory. Erasing of the information memoried can be effected by applying an electric field while heating to a predetermined temperature to change the state to that of FIG. 2(B), followed by cooling.

If desired, the phase separation liquid crystal polymer of the present invention may further contain a low-molecular weight compound as a third component. While a phase separation liquid crystal polymer containing no low-molecular weight compound is usable as a display element or a memory element, it turned out that addition of a low-molecular weight compound as a third component brings about an improvement on contrast or rate of response. It is essentially desirable that a low-molecular weight compound to be incorporated is miscible or compatible with the liquid crystal component in the separate phase liquid crystal polymer but immiscible or incompatible with other components. This is because a low-molecular weight compound can first produce the above-described effects when mixed with a liquid crystal phase, and no effect is expected if it is introduced into other phases.

It was found that addition of a dichroic dyestuff as a low-molecular weight compound results in an increase in contrast as a display element. Examples of suitable dichroic dyestuffs include anthraquinone dyes, styryl dyes, azomethine dyes, and azo dyes. A suitable amount of the dichroic dyestuff to be added ranges from 0.1 to 50% by weight, and preferably from 0.1 to 10% by weight, based on the liquid crystal polymer. If it is excessive, orientation properties of the liquid crystal molecules are liable to reduce. If it is too small, the effect of increasing a contrast is liable to reduce.

It was confirmed that the above-described effects of low-molecular weight compounds are ascribed to a reduction in viscosity of the liquid crystal component in the liquid crystal polymer, which leads to an improvement in rate of response, i.e., rate of change of orientation of the liquid crystal component, to the action of an electric field.

The low-molecular weight compounds which can be used in the present invention include bicyclohexyl compounds and cyclohexylbenzene compounds, such as bicyclohexyl, cyclohexylbenzene, and bicyclohexyl or cyclohexylbenzene compounds having various alkyl groups. The amount of the low-molecular weight compound to be added is from 0.1 to 50% by weight, and preferably from 10 to 50% by weight, based on the liquid crystal polymer. If it exceeds 50% by weight, orientation of liquid crystal molecules is liable to reduce. If it is lower than 0.1% by weight, effects produced are liable to imperceptively be small. The above-specified weight ratio is also based on the fact that an effective response of liquid crystal molecules to an electric field is assured as long as the viscosity of the liquid crystal component in the polymer falls within a proper range. Considering this fact, various kinds of plasticizers (e.g., aliphatic or aromatic esters) and low-molecular weight liquid crystal compounds as described above would be effective as well in reducing viscosity to produce the above-described effects. These low-molecular weight compounds may be used either individually or in combination of two or more thereof.

Devices using the phase separation liquid crystal polymer according to the present invention suitably have a laminate structure between a pair of electrodes. Such a structure can be prepared, for example, by coating a solution of a phase separation liquid crystal polymer on one electrode substrate and removing the solvent by drying to form a polymer layer, and superposing the other electrode substrate on the polymer layer. A separately formed polymer sheet may be sandwiched between a pair of electrode substrates. Appropriate spacers such as glass particles, polymer particles, glass rods, and polymer film having a diameter or thickness of 3 to 50 μm are preferably inserted between two electrodes as is well known in the art.

While a basic structure of devices comprises a phase separation liquid crystal polymer layer and a pair of electrode substrates as stated above, an appropriate protective layer may be provided to advantage between the polymer layer and an electrode substrate.

The present invention is now illustrated in greater detail with reference to examples, but it should be understood that the present invention is not deemed to be limited thereto.

EXAMPLE 1

Nine grams of a cyanobiphenyl type acrylic monomer having formula (1) shown below and 1.0 g of butyl acrylate were copolymerized in tetrahydrofuran (hereinafter abbreviated as THF) using azobisvaleronitrile ("V-65", produced by Wako Pure Chemical Industries, Ltd.) as an initiator. The reaction mixture was purified by using methanol to collect about 9 g of a liquid crystal polymer.

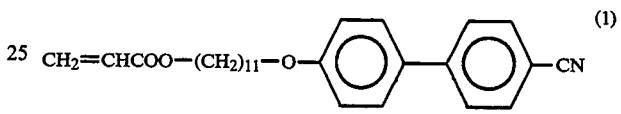

(1)

The resulting polymer was dissolved in THF, and the solution was coated on NESA glass (a trade name of transparent conductive glass covered with tin-antimony type oxide transparent conductive film) and dried to form an opaque (turbid) film having a thickness of about 30 μm.

NESA glass was press-bonded on the film to prepare a laminate cell. The cell had an He-Ne laser light transmission of about 10%.

When an alternating voltage of 50 Vp-p, 100 Hz was applied to the cell at 40° C., the film became transparent having an He-Ne laser light transmission of about 80%. The time required for the change was about 0.5 second. When "on" and "off" of voltage application were alternately repeated, the change between the transparent state and the opaque state were repeatedly reproduced correspondingly.

EXAMPLE 2

Nine grams of a cyanophenyl benzoate type acrylic monomer of formula (2) shown below and 1.0 g of 2-ethylhexyl acrylate were polymerized in the same manner as in Example 1 to obtain about 8 g of a liquid crystal polymer.

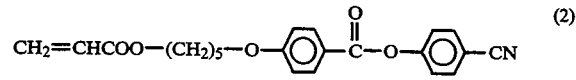

(2)

The resulting polymer was coated on NESA glass and dried in the same manner as in Example 1 to form an opaque (turbid) film having a thickness of about 30 μm. A transparent conductive polyethylene terephthalate film ("T-Coat" produced by Teijin Limited) was press-bonded on the film to prepare a laminate cell. The cell had an He-Ne laser light transmission of 10%.

When a voltage was applied to the cell in the same manner as in Example 1, the film changed from opaque to transparent (He-Ne laser light transmission: about 80%). The time required for the film to become transparent was about 0.5 second. When "on" and "off" of voltage application were alternately repeated, the change between the transparent state and the opaque state were repeatedly reproduced correspondingly.

EXAMPLE 3

One gram of the liquid crystal polymer obtained in Example 1 was dissolved in 5.0 g of THF, and 0.2 g of a mixture of a dichroic dye and a low-molecular liquid crystal ("D 102 E 63" produced by BDH Co.) was dissolved therein. The resulting solution was coated on NESA glass and dried to form a blue film having a thickness of about 20 μm. NESA glass was press-bonded on the film to prepare a laminate cell. The cell had an He-Ne laser light transmission of about 3%.

When a voltage was applied to the cell in the same manner as in Example 1, the film changed to transparent (He-Ne laser light transmission: about 75%). The time required for the change was about 0.4 second. When "on" and "off" of voltage application were alternately repeated, the change between the transparent state and the opaque (blue color) state were repeatedly reproduced correspondingly.

EXAMPLE 4

One gram of the liquid crystal polymer obtained in Example 1 was dissolved in 5.0 g of THF, and 0.2 g of 1-n-pentyl-4-phenylcyclohexane was dissolved therein. The resulting solution was dried on NESA glass and dried to form an opaque (turbid) film having a thickness of about 20 μm. NESA glass was press-bonded on the film to prepare a laminate cell. The cell had an He-Ne laser light transmission of about 5%.

When a voltage was applied to the cell in the same manner as in Example 1, the film instantly changed to transparent (He-Ne laser light transmission: about 80%). The time required for the change was about 0.3 second. The change between the transparent state and the opaque state could be repeatedly reproduced in agreement with "on" and "off" of voltage application.

EXAMPLE 5

A cyanophenyl benzoate compound having a reactive double bond as represented by formula (3) shown below was used as a liquid crystal compound.

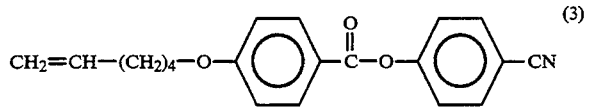

(3)

A 2:1 (by mole) mixture of the above liquid crystal compound and 1-hexene was reacted with a reactive silicone (poly(hydrogenmethylsiloxane) produced by Shin-etsu Chemical Industries, Ltd.) in THF in the presence of a platinum catalyst. Analysis of the resulting polymer revealed that the degree of substitution was about 90% and the composition ratio of the liquid crystal and 1-hexene was the same as the charging ratio. The polymer was dissolved in THF, and the solution was coated on NESA glass and dried to form an opaque (turbid) film having a thickness of 30 μm. NESA glass was press-bonded thereon to prepare a laminate cell. The cell had an He-Ne laser light transmission of about 10%.

When a voltage was applied to the cell in the same manner as in Example 1, the film changed from opaque to transparent (He-Ne laser light transmission: about 80%). The time required for the change was about 0.2 second. The change between the transparent state and the opaque state could be reproduced repeatedly in agreement with "on" and "off" of voltage application.

EXAMPLE 6

A cyanobiphenyl type acrylic monomer having formula (4) shown below was used as a liquid crystal compound.

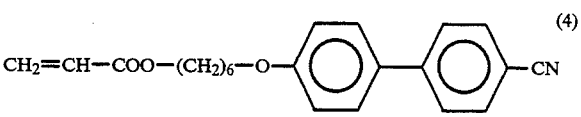

(4)

Nine grams of the liquid crystal monomer and 1.0 g of ethyl acrylate were polymerized in THF in the presence of azobisisobutyronitrile as an initiator. The reaction mixture was purified by using methanol to obtain about 9.5 g of a liquid crystal polymer. The resulting polymer was dissolved in THF, and the solution was coated on NESA glass and dried to form an opaque (turbid) film having a thickness of about 20 μm. NESA glass was press-bonded thereon to prepare a laminate cell. The cell had an He-Ne laser light transmission of about 5%.

The cell was heated to 100° C. to keep the liquid crystal polymer in an isotropic state. An alternating voltage of 200 Vp-p, 500 Hz was applied to the cell while keeping the isotropic state. Then, the cell, maintained on voltage application, was gradually cooled to room temperature, whereby the film turned to transparent, which state was maintained even with no voltage applied (He-Ne laser light transmission: 80%).

With no voltage applied, an He-Ne laser beam (10 mW) condensed to a diameter of about 100 μm was irradiated on the cell for writing, whereby the irradiated spots were heated and rapidly cooled to become turbid. The contrast between the opaque spots and the transparent background was found to be about 10 as determined from percent transmission of He-Ne laser The image thus formed was stably held at room light. The image thus formed was stably held at room temperature for more than 2 months, showing a memory property. The image could be erased by re-heating (the cell changes into an isotropic state) followed by cooling while applying a voltage. Writing and erasing could be repeatedly conducted.

COMPARATIVE EXAMPLE

The liquid crystal monomer as used in Example 1 was polymerized in THF using V-65 as an initiator to obtain a homopolymer. A THF solution of the resulting polymer was coated on NESA glass and dried to form a slightly turbid film having a thickness of about 30 μm. NESA glass was press-bonded thereon to prepare a laminate cell. The cell had an He-Ne laser light transmission of about 65%. When a voltage was applied to the cell under the same conditions as in Example 1, no change occurred. Further, the same voltage was applied at 90° C., the film gradually became transparent (He-Ne laser light transmission: about 80%). The time required for the cell to become transparent with a voltage applied was about 2 seconds.

As described above, since the liquid crystal element according to the present invention comprises a polymeric material, it is possible to prepare a wide area display which has a high rate of response to external signals given by voltage application and requires no polarizing sheet. In addition, because the liquid crystal component and non-liquid crystal component are in separate phases, a display of high contrast can be made The liquid crystal polymer of the present invention also finds its use in memory devices having high contrast.

While the invention has been described in detail and with reference to specific examples thereof, it will be apparent to one skilled in the art that various changes and modifications can be made therein without departing from the spirit and scope thereof.

What is claimed is:

1. An optical modulation element having (a) a liquid crystal polymer containing side chains comprising on the side chains thereof at least one liquid crystal component and at least one non-liquid crystal component, said liquid crystal component and non-liquid crystal component being present in separate phases and (b) a means for applying an electric field to said polymer, wherein said polymer is a polymer obtained by copolymerizing a liquid crystal vinyl monomer and a non-liquid crystal vinyl monomer.

2. An optical modulation element as claimed in claim 1, wherein said liquid crystal vinyl monomer is present in the proportion of from 10 to 99.9% by weight.

3. An optical modulation element as claimed in claim 2, wherein said liquid crystal vinyl monomer is present in the proportion of from 50 to 99.5% by weight.

4. An optical modulation element as claim in claim 1, wherein said polymer further contains at least one low-molecular weight compound which is compatible with the liquid crystal component.

5. An optical modulation element as claimed in claim 4, wherein the content of the low-molecular weight compound is from 0.1 to 50% by weight based on the liquid crystal polymer.

6. An optical modulation element as claimed in claim 4, wherein the low-molecular weight compound is a dichroic dyestuff.

7. An optical modulation element as claimed in claim 4, wherein the low-molecular weight compound is a bicyclohexyl compound or a cyclohexylbenzene compound.

8. An optical modulation element having a pair of electrodes having therebetween a liquid crystal polymer containing side chains comprising on the side chains thereof at least one liquid crystal component and at least one non-liquid crystal component being present in separate phases, wherein said polymer is a polymer obtained by copolymerizing a liquid crystal vinyl monomer and a non-liquid crystal vinyl monomer.

9. An optical memory having a pair of electrodes having therebetween a liquid crystal polymer containing side chains comprising on the side chains thereof at least one liquid crystal component and at least one non-liquid crystal component, said liquid crystal component and non-liquid crystal component being present in separate phases, and said polymer having a glass transition temperature of not less than 30° C., wherein said polymer is a polymer obtained by copolymerizing a liquid crystal vinyl monomer and a non-liquid crystal vinyl monomer.

10. A display device having a pair of electrodes having therebetween a liquid crystal polymer containing side chains comprising on the side chains thereof at lest one liquid crystal component and at least one non-liquid crystal component, said liquid crystal component and non-liquid crystal component being present in separate phases, and said polymer having a glass transition temperature of not more than 0° C., wherein said polymer is a polymer obtained by copolymerizing a liquid crystal vinyl monomer and a non-liquid crystal vinyl monomer.

11. An optical modulation element which is optically modulated by application of an electric field having (a) a liquid crystal polymer containing side chains comprising on the side chains thereof at least one liquid crystal component and at least one non-liquid crystal component, said liquid crystal component and non-liquid crystal component being present in separate phases and (b) a means for applying an electric field to said polymer, wherein said polymer is an addition polymer obtained by adding a liquid crystal compound having a vinyl group or an active proton and a non-liquid crystal compound having a vinyl group or an active proton to a partially hydrogenated silicone polymer.

12. An optical modulation element having a pair of electrodes having therebetween a liquid crystal polymer containing side chains comprising on the side chains thereof at least one liquid crystal component and at least one non-liquid crystal component, said liquid crystal component and non-liquid crystal component being present in separate phases and wherein said polymer is an addition polymer obtained by adding a liquid crystal compound having a vinyl group or an active proton and a non-liquid crystal compound having a vinyl group or an active proton to a partially hydrogenated silicone polymer.

13. An optical memory having a pair of electrodes having therebetween a liquid crystal polymer containing side chains comprising on the side chains thereof at least one liquid crystal component and at least one non-liquid crystal component, said liquid crystal component and non-liquid crystal component being present in separate phases and wherein said polymer is an addition polymer obtained by adding a liquid crystal compound having a vinyl group or an active proton and a non-liquid crystal compound having a vinyl group or an active proton to a partially hydrogenated silicone polymer, and said polymer having a glass transition temperature of not less than 30° C.

14. A display device element having a pair of electrodes having therebetween a liquid crystal polymer containing side chains comprising on the side chains thereof at least one liquid crystal component and at least one non-liquid crystal component, said liquid crystal component and non-liquid crystal component being present in separate phases and wherein said polymer is an addition polymer obtained by adding a liquid crystal compound having a vinyl group or an active proton and a non-liquid crystal compound having a vinyl group or an active proton to a partially hydrogenated silicone polymer, and said polymer having a glass transition temperature of not more than 0° C.

* * * * *

UNITED STATES PATENT AND TRADEMARK OFFICE
CERTIFICATE OF CORRECTION

PATENT NO. : 5,354,498
DATED : October 11, 1994
INVENTOR(S) : Ryojiro Akashi et al.

It is certified that error appears in the above-indentified patent and that said Letters Patent is hereby corrected as shown below:

Claim 4, Column 11, Line 31 change "claim" (first occurrence) to --claimed--.

Claim 10, Column 12, Line 5 change "lest" to --least--.

Signed and Sealed this

Eleventh Day of April, 1995

Attest:

BRUCE LEHMAN

*Attesting Officer*    Commissioner of Patents and Trademarks